I. LAPIDUS.
DRILL.
APPLICATION FILED OCT. 21, 1914.
1,138,490.
Patented May 4, 1915.
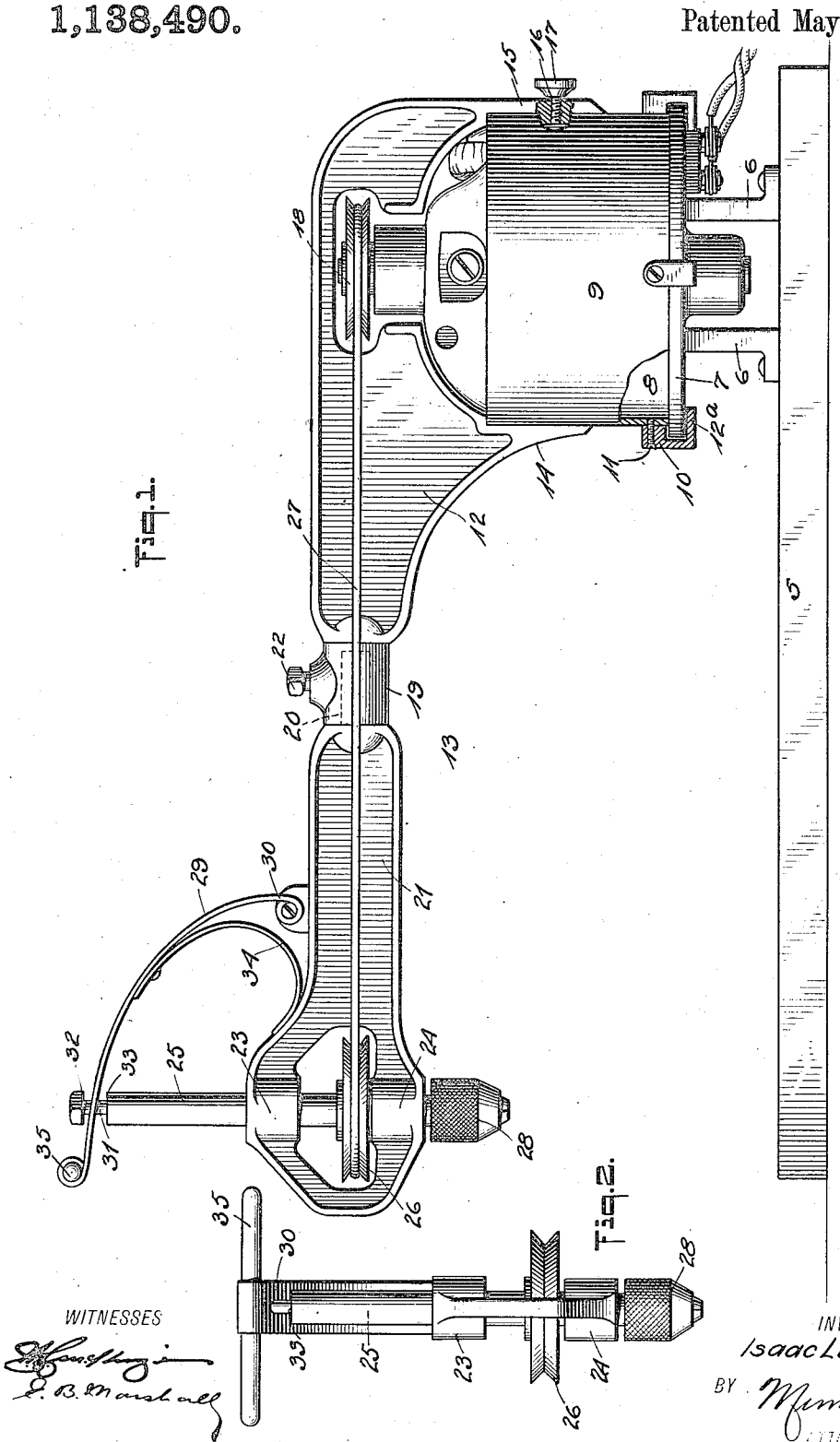
WITNESSES
INVENTOR
Isaac Lapidus
BY
ATTORNEYS

UNITED STATES PATENT OFFICE.

ISAAC LAPIDUS, OF NEW YORK, N. Y.

DRILL.

1,138,490.     Specification of Letters Patent.     Patented May 4, 1915.

Application filed October 21, 1914. Serial No. 867,800.

*To all whom it may concern:*

Be it known that I, ISAAC LAPIDUS, a subject of the Czar of Russia, and a resident of New York city, borough of Brooklyn, in the county of Kings and State of New York, have invented a new and Improved Drill, of which the following is a full, clear and exact description.

My invention has for its object to provide a drill having an arm rotatably mounted on a motor, the arm having a section which is rotatably mounted on the body of the arm on an axis extending longitudinally of the arm body, the section of the arm having bearings in which a spindle is journaled, the spindle being rotatable by a belt connected with the motor shaft and being movable longitudinally of the axis of its bearings to carry a tool secured to the spindle into operative position.

Additional objects of the invention will appear in the following specification in which the preferred form of my invention is disclosed.

In the drawings similar reference characters refer to similar parts in all the views in which—

Figure 1 is a side elevation of the invention, parts being broken away to show the construction; and Fig. 2 is an end view of the arm and the spindle.

By referring to the drawings it will be seen that on a support 5 there are secured legs 6 which extend downward from a base 7 of a motor 8. The base 7 extends beyond the sides of the motor and disposed on the base 7 and encircling the motor there is a casing 9, lugs 10 being secured to the casing 9 by the screws 11, these lugs 10 having flanges 12ª which are disposed under the motor base 7 to hold the casing 9 in position while permitting the rotation of the casing relatively to the motor. Disposed over the casing 9 there is a base section 12 of an arm 13, this base section 12 having a projection 14 for engaging one side of the casing 9, and another projection or finger 15 for engaging the opposite side, the projection 15 having a threaded orifice 16 in which a screw 17 meshes, this screw 17 being provided for engaging the casing 9 to hold the base section 12 and the arm in position relatively to the said casing.

As will be seen by referring to Fig. 1 of the drawings, the base section 12 is cut away so that the motor and the pulley 18 secured to the motor shaft will not interfere with the rotation of the arm 13 on an axis coinciding with the axis of the motor shaft. The base section 12 has a bearing 19 in which is disposed a stud 20 on the arm section 21, this construction being provided so that the arm section may be rotated on an axis extending longitudinally of the base section 12. When the arm section 21 is rotated to the desired position it is held in place by the set screw 22 which is of the usual construction. The arm section 21 has bearings 23 and 24 in which are disposed a spindle 25, a pulley 26 being mounted on the spindle 25 between the bearings 23 and 24, this pulley 26 being keyed to the spindle so that when the pulleys 18 and 26 are connected by the belt 27, the motor 8 will rotate the spindle 25, the usual means 28 being provided to secure tools of any desired character to the spindle so that the tools will be rotated by the motor. An arm 29 is pivoted at 30 to the arm section 21 and this arm 29 has an orifice through which the spindle 25 is disposed at 31 between its shoulders 32 and 33, the arm 29 being held yieldingly upwardly by means of the spring 34 and having a handle 35 by which it may be conveniently pressed downward.

It will be understood that one of the drills described may be placed at the center of the table around which several operatives may be at work, it being possible for any one of the operatives to operate the arm 13 so that the spindle 25 will be disposed in front of him when the arm section 21 may be turned so that the spindle 25 will be disposed at any desired angle relatively to the axis of the motor and may be held in this position by the set screw 22. When this has been done, any desired tool may be secured to the spindle 25, and the spindle with the tool may be pressed into operative position.

Having thus described my invention I claim as new and desire to secure by Letters Patent:

1. In a drill, a motor having a shaft, a casing disposed around the motor and rotatable relatively thereto, an arm secured to the casing for rotating therewith, bearings in the arm, a spindle disposed in the bearings and movable longitudinally relatively thereto, means connecting the shaft with the spindle for rotating the latter, and means for securing a tool to the spindle.

2. In a drill, a motor having a shaft, a casing disposed around the motor and rotatable relatively thereto, an arm section secured to the casing, a second arm section pivoted to the first arm section on an axis extending longitudinally of the first arm section, bearings on the second arm section, a spindle disposed in the bearings, and movable longitudinally relatively thereto, means connecting the shaft with the spindle for rotating the spindle, and means for securing a tool to the spindle.

In testimony whereof I have signed my name to this specification in the presence of two subscribing witnesses.

ISAAC LAPIDUS.

Witnesses:
 PETER C. PINT,
 LOUIS WEBER.